W. H. HANSON.
GLASS CUTTING MACHINE.
APPLICATION FILED DEC. 7, 1907.

910,129.

Patented Jan. 19, 1909.
4 SHEETS—SHEET 1.

WITNESSES:
Carl A. Richmond
Edythe M. Anderson.

INVENTOR
William H. Hanson
BY
Sheridan and Wilkinson
ATTORNEYS

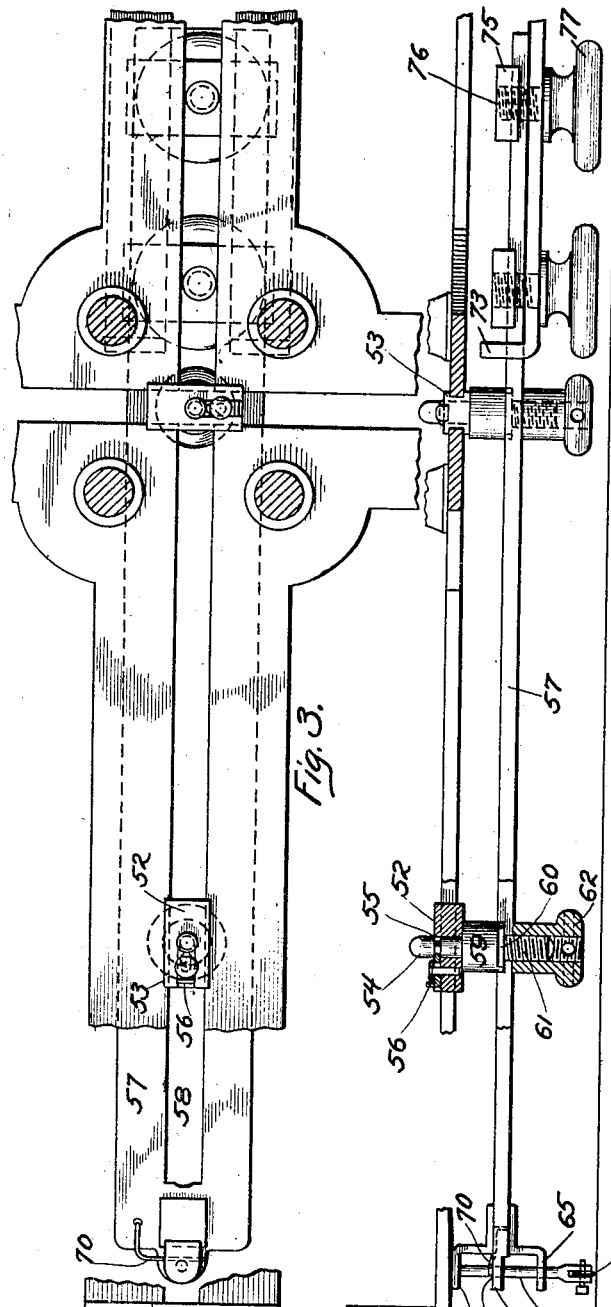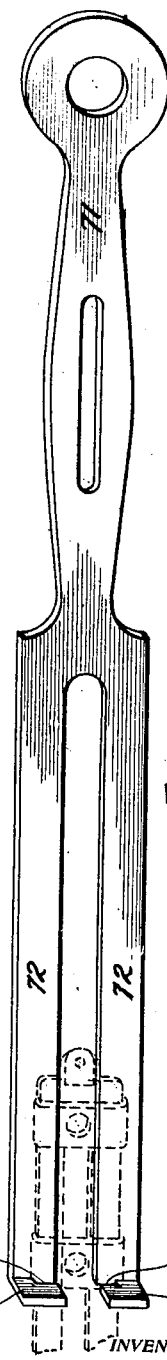

UNITED STATES PATENT OFFICE.

WILLIAM H. HANSON, OF FORT MADISON, IOWA.

GLASS-CUTTING MACHINE.

No. 910,129.  Specification of Letters Patent.  Patented Jan. 19, 1909.

Application filed December 7, 1907. Serial No. 405,465.

*To all whom it may concern:*

Be it known that I, WILLIAM H. HANSON, a citizen of the United States, residing at Fort Madison, in the county of Lee and State of Iowa, have invented certain new and useful Improvements in Glass-Cutting Machines, of which the following is a specification.

The object of my invention is to provide a machine which may be used to cut glass in either circular or elliptical shapes.

Further objects of my invention are to so mount a glass cutting machine that it can be moved out of the way when not in use and to provide a table to receive the glass which can be definitely positioned with reference to the glass cutting mechanism.

All these objects and others will be made apparent from the following specification and claims.

Figure 1:
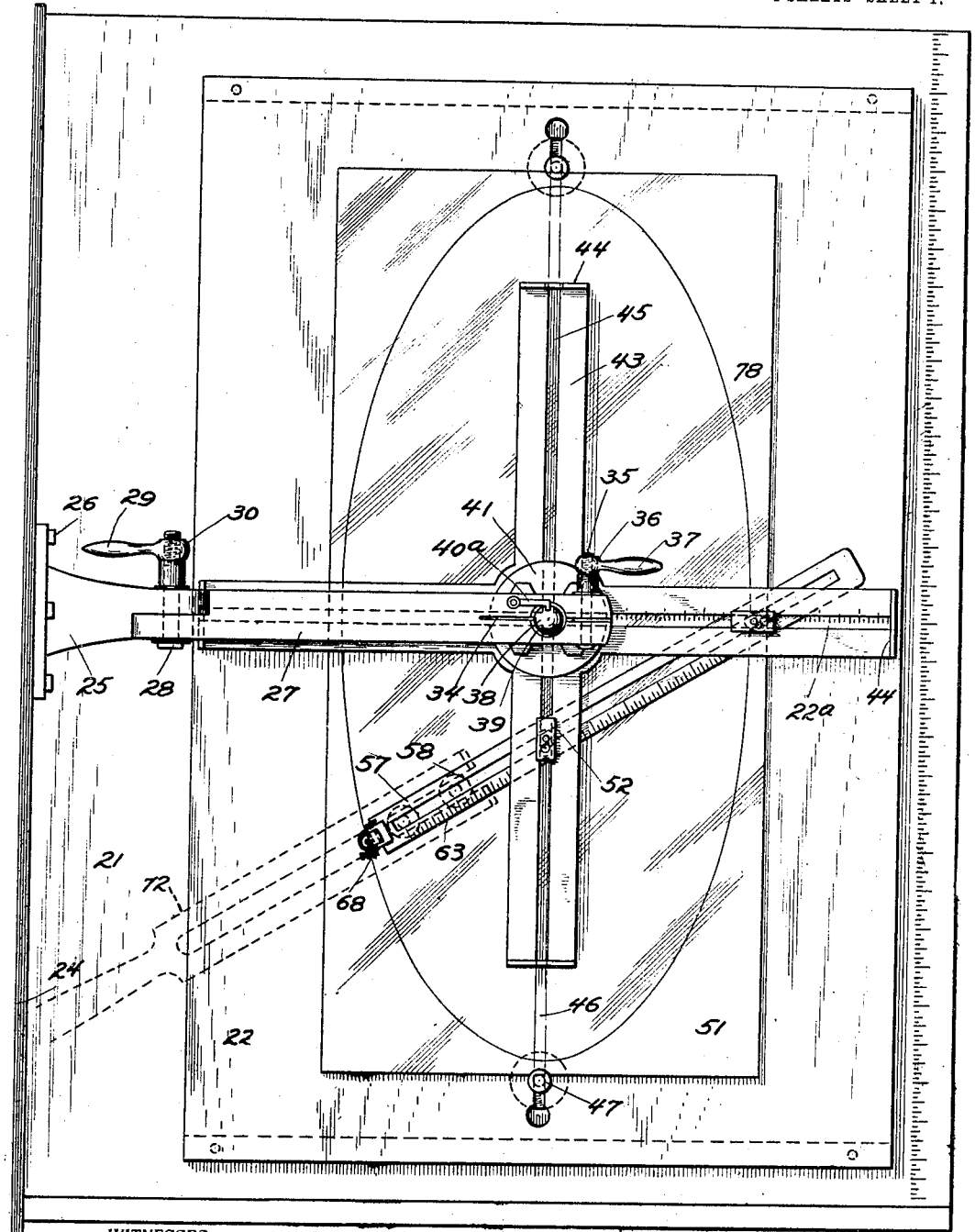
Figure 2:
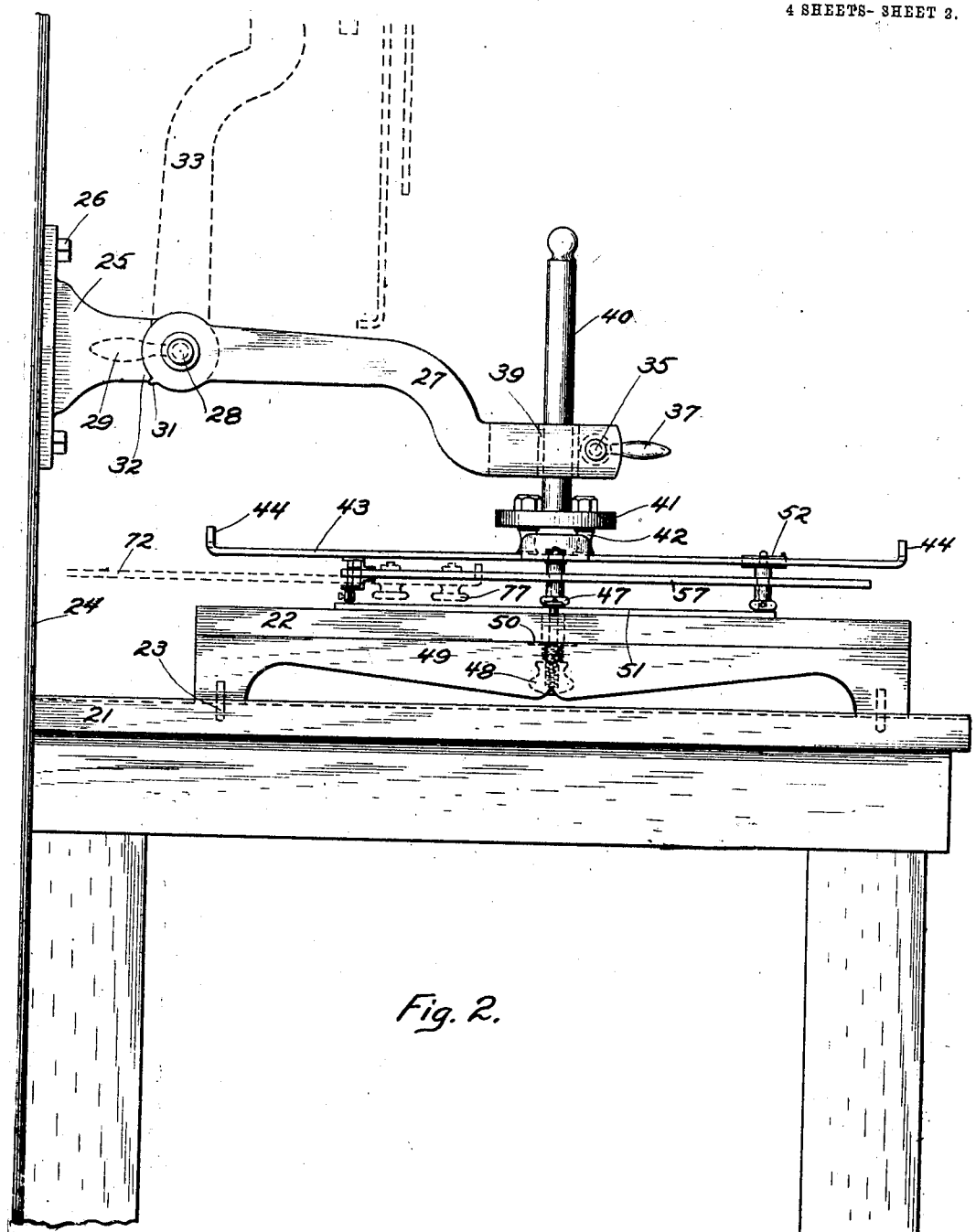
Figure 6:
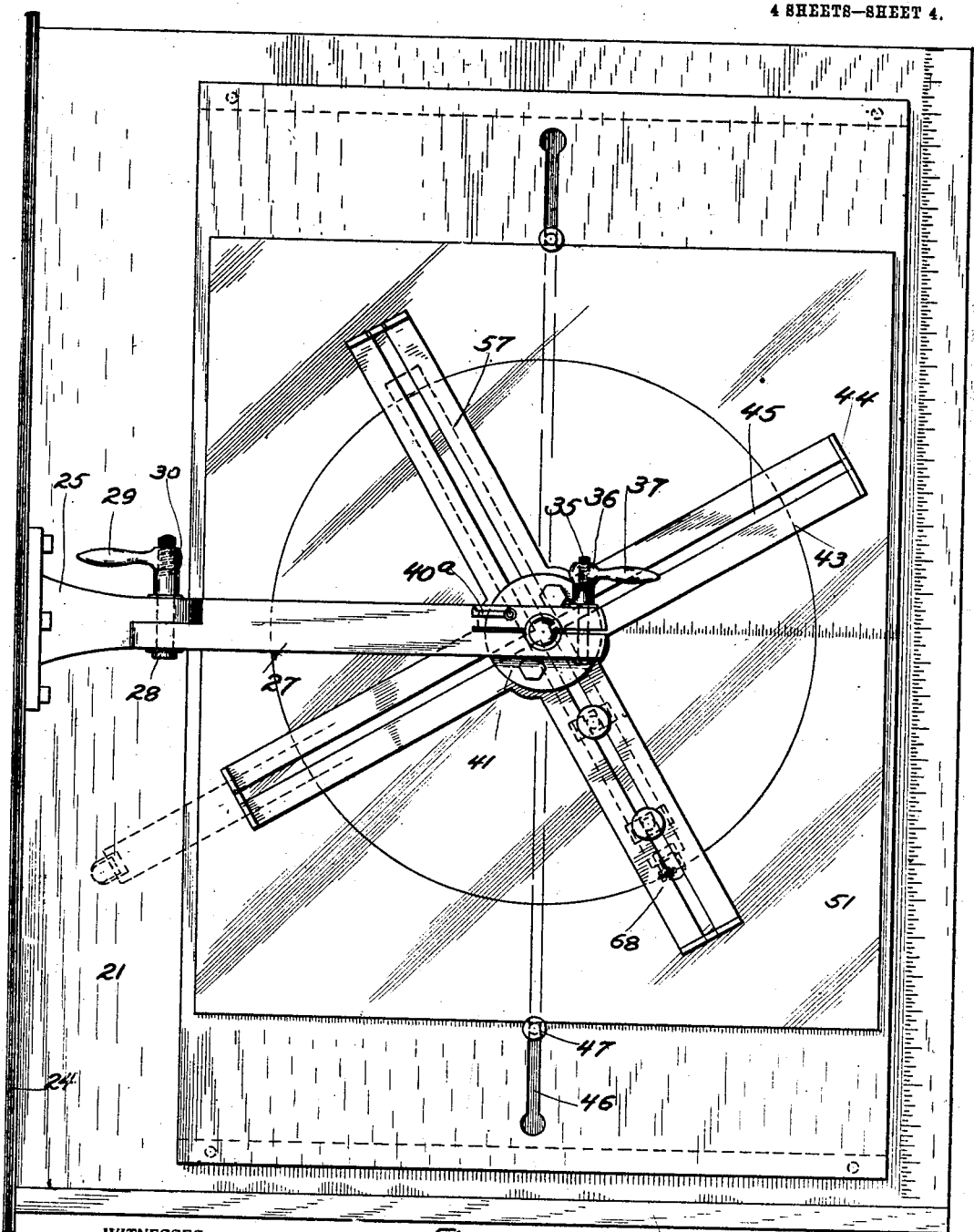

Referring to the drawings—Figure 1 is a top plan view of my improved machine. Fig. 2 is a side elevation. Fig. 3 is a top plan view of a detail. Fig. 4 is a side elevation of the same detail. Fig. 4ª is a side elevation of the cutter. Fig. 5 is a perspective view of an extension handle. Fig. 6 is a top plan view corresponding to Fig. 1, but showing the apparatus readjusted for cutting a circle.

On the bench 21 the detachable table 22 may be placed, and pins 23 extending into both the bench and the table serve to fix the table in definite position. The side wall back of the bench is designated by the reference numeral 24. A bracket 25 stands out from this, being attached to the wall by bolts 26. An arm 27 is pivoted on the bracket by means of the bolt 28, and a nut 30 on the end of this bolt actuated by the handle 29 serves to clamp the arm in any desired position. A lug 31 on the arm 27 coacting with a shoulder 32 on the bracket 25 serves to limit the arm 27 so that it cannot go any lower than shown in Fig. 2. The dotted lines indicated by the reference numeral 33 in Fig. 2 show the arm 27 in its upturned position.

The extremity of the arm 27 has a slot 34, and the bolt 35 with the nut 36 actuated by the handle 37 serves to clamp the forked ends of the arm together. There is a hole 38 through the end of the arm surrounded by bushing members 39. A round post 40 passes through this hole. This post 40 has a longitudinal groove adapted to be engaged by the tongue 40ª which will hold the post 40 in a definite position. The bottom end of the post 40 has attached thereto a round plate 41, and from this four little standards 42 depend and support the cross shaped frame 43. This cross shaped frame 43 has two slots 45 and the extremities are bent up as indicated by the reference numeral 44.

The table 22 has a long slot 46 extending across it with two short bolts extending therethrough. The head of each bolt overlaps the edges of the slot on one side, and a washer 50 held by the thumb nut 48 and intermediate spring 49 overlaps the edges of the slot 46 on the other side. The head of the bolt 47 may be caught over the edge of the glass plate 51 which is to be acted upon and the spring 49 will thus hold the said glass plate 51 to the table 22.

In each slot 45 of the cross frame 43 there is a sliding member or carriage 52. This has flanges 53 that overhang the edges of the slot and a hole adapted to receive the stud 54. This stud 54 has an annular groove 55 around it, and a little slide 56 on the carriage 52 is adapted to engage the said groove and keep the stud 54 in the hole in the carriage 52.

The reference numeral 57 designates a bar having a long slot 58 therein. One edge of this is graduated, as indicated by the reference numeral 63. A little block 59 carries the aforesaid stud 54. Opposite sides thereof are cut away as indicated by the reference numeral 60, so that the block 59 may be guided without permitting rotation by the slot 45. A screw 61 projects from the block 59 and the thumb nut 62 serves to clamp it at any definite place along the bar 57.

At one extremity of the bar 57 there are two perforated projections 64 and 65 through which the little shaft 67 extends. The projection 66 is not perforated and acts as a stop to hold the said shaft 67. This shaft 67 carries a glass cutting wheel 68 at its lower end and has an annular groove 69 adapted to be engaged by the spring tongue 70 which will thus hold the shaft 67 rotatably mounted in the end of the bar 57.

An extension handle 71—illustrated in Fig. 5—has two parallel members 72 each terminating in an upturned portion 73 having a notch 74. These notches are adapted to slide over the edges of the bar 57. A yoke 75 and a coacting screw bolt 76 with a milled head 77 serve to clamp the handle 71 to the bar 57.

When the glass cutter is not in use, it can be swung up—as indicated by the dotted lines in Fig. 2—and held in this position by means of the handle 29 and the parts locked thereby. The auxiliary table 22 can be removed from the bench 21 and put aside, thus leaving the bench free and unobstructed for other work. When it is desired to use the glass cutter the bench can be placed definitely in position, this definiteness being secured by means of the pins 23. Then the handle 29 can be loosened and the arm 27 swung down into substantially horizontal position, as determined by the coacting shoulders 31 and 32. Then the handle 37 can be loosened and the shaft 40 adjusted up and down to the desired height. If it is desired to cut an ellipse, the shaft 40 should be rotated until the pawl 40ª engages the groove therein. Then the handle 37 should be clamped tight and the operator may be assured that the center of the ellipse about to be cut will be over the center of the table 22 and that the axes of the ellipse will be properly oriented. A scale 22ª extends from the center of the table 22 out to one edge. On this scale actual half inches are numbered as full inches so that the minor diameter of the ellipse can be read directly on the scale. The scale 63 on the bar 57 is also graduated with half inches counted as full inches. The milled heads 62 are loosened and the blocks 59 are slid along until the block nearest the cutter wheel 68 is opposite the desired number of inches for the minor axis and the block farthest from the cutter wheel is opposite the number of inches for the major axis. Then the milled heads 62 are tightened and the studs 54 are thrust into the holes in the respective carriages 52 and retained by the slides 56. With the parts positioned as described, the operator may seize the bar 57 near the cutter wheel 68 and move it so as to cut the ellipse. It will be constrained to do this by the mechanism that has been described. This having been done, the glass plate 51 can be removed by releasing the bolts 47 against the springs 49. Then with an ordinary glass cutter a short cut 78 can be made from the outline of the ellipse to the edge of the glass plate, and working from this point the glass outside of the ellipse may all be broken away therefrom.

To avoid the inconvenience of having to reach under the frame 43 to get hold of the cutter bar 57, the extension handle 71 is provided. Its application and use are obvious.

When it is desired to use the machine to cut circles instead of ellipses, the cutter bar 57 is removed from the position that has been described, and which is illustrated in Fig. 1, and is clamped tight to one of the arms of the cross frame 43—as illustrated in Fig. 6. Then the pawl 40 is disengaged from the post 40 and the clamping handle 37 is loosened enough so as to permit the post 40 to rotate in the bushings 39. The operator may then seize hold of one of the cross frame members 43 and rotate the said frame, thus causing the cutter wheel 68 to cut a circle.

It will be seen that I have provided a glass cutting machine which may be used to cut ellipses of a wide variety of sizes and shapes or circles of various sizes. It may readily be displaced when not in use so as to be out of the way. The glass may be quickly inserted or withdrawn and operation of the machine takes only a very few minutes of time.

What I claim is:

1. A glass cutting machine comprising a table to hold the glass, a support extending over the table, a guiding frame mounted on the support and adapted to be fixed or rotated with reference thereto, and a bar carrying a cutting member adapted to be guided by the frame when it is fixed or to be clamped to the frame when it is rotated.

2. A glass cutting machine comprising a guiding frame adapted to be fixed or rotated, and a cutter adapted to be guided in an elliptical course by the frame when it is fixed, or to be guided in a circular course by the frame when it is rotated.

3. In a glass cutting machine, a table to hold the glass, a support above the table, a frame adapted to be clamped and act as a guide for the purpose of tracing an ellipse, or to be released and rotate about a pivot on the support, and a cutting member adapted to be carried in a circular course by the rotation of said frame.

WILLIAM H. HANSON.

Witnesses:
W. S. HAMILTON,
L. LAMMERS.